United States Patent
Nishimura et al.

(10) Patent No.: US 9,567,952 B2
(45) Date of Patent: Feb. 14, 2017

(54) INTAKE SYSTEM OF SADDLE-TYPE VEHICLE

(71) Applicant: HONDA MOTOR CO., LTD., Tokyo (JP)

(72) Inventors: Shin Nishimura, Wako (JP); Takahiro Sano, Wako (JP); Hiroaki Tsukui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 141 days.

(21) Appl. No.: 14/560,366

(22) Filed: Dec. 4, 2014

(65) Prior Publication Data

US 2015/0159604 A1   Jun. 11, 2015

(30) Foreign Application Priority Data

Dec. 10, 2013   (JP) .................. 2013-254736

(51) Int. Cl.
| | |
|---|---|
| *F02M 35/16* | (2006.01) |
| *F02M 35/04* | (2006.01) |
| *B62K 11/04* | (2006.01) |
| *F02M 35/02* | (2006.01) |
| *F02M 35/10* | (2006.01) |

(52) U.S. Cl.
CPC ............. *F02M 35/162* (2013.01); *B62K 11/04* (2013.01); *F02M 35/0207* (2013.01); *F02M 35/044* (2013.01); *F02M 35/048* (2013.01); *F02M 35/10013* (2013.01); *F02M 35/10091* (2013.01); *F02M 35/10262* (2013.01)

(58) Field of Classification Search
CPC ...... F02M 35/162; F02M 35/14; F02M 35/04; F02M 35/116; F02M 35/02; F02M 35/10013; F02M 35/024; F02M 35/10144; F02M 35/161; F02M 35/10321; F02M 35/10262; F02M 35/1211; F02M 35/1216; F02M 35/10111
USPC ............................ 123/198 E, 184.21–184.61
See application file for complete search history.

(56) References Cited

U.S. PATENT DOCUMENTS

| | | | | |
|---|---|---|---|---|
| 5,031,401 | A * | 7/1991 | Hinderks | F01N 3/022 60/282 |
| 5,063,884 | A * | 11/1991 | Rutschmann | F02B 27/00 123/184.42 |
| 7,165,525 | B2 * | 1/2007 | Vogel | F02M 35/1255 123/184.57 |
| 7,188,604 | B2 * | 3/2007 | Isaji | F02B 31/06 123/308 |

(Continued)

FOREIGN PATENT DOCUMENTS

JP   2005-343356   12/2005

*Primary Examiner* — Long T Tran
(74) *Attorney, Agent, or Firm* — Rankin, Hill & Clark LLP (57) ABSTRACT

An intake system includes an air cleaner that is disposed above an engine main body mounted on a vehicle body frame and connected to cylinder heads of the engine main body and an air introducing unit for introducing air into an air inlet provided at a lateral part of the air cleaner on at least one side thereof in a vehicle width direction. The air introducing unit has an opened front end and is connected to the air cleaner so as to bend an intake direction from a vehicle front-rear direction to the vehicle width direction. In the air inlet, a plurality of ribs partition the air inlet into plural sections.

16 Claims, 8 Drawing Sheets

(56) References Cited

U.S. PATENT DOCUMENTS

| | | | | |
|---|---|---|---|---|
| 7,290,519 | B2* | 11/2007 | Ohba | F02B 27/02 |
| | | | | 123/184.21 |
| 7,322,333 | B2* | 1/2008 | Isaji | F02B 31/06 |
| | | | | 123/184.51 |
| 7,357,205 | B2* | 4/2008 | Nishizawa | F02M 35/022 |
| | | | | 123/41.56 |
| 7,493,881 | B2* | 2/2009 | Smith | F02M 35/024 |
| | | | | 123/184.21 |
| 2004/0074466 | A1* | 4/2004 | Powell | F02M 35/024 |
| | | | | 123/184.42 |
| 2004/0093839 | A1* | 5/2004 | Storz | F02M 35/04 |
| | | | | 55/385.3 |
| 2008/0178831 | A1* | 7/2008 | Enokida | F02M 35/10039 |
| | | | | 123/184.61 |
| 2012/0304965 | A1* | 12/2012 | Uchiyama | F02D 9/105 |
| | | | | 123/399 |

* cited by examiner

INTAKE SYSTEM OF SADDLE-TYPE VEHICLE

BACKGROUND OF THE INVENTION

Field of the Invention

The present invention relates to the following intake system of a saddle-type vehicle.

Description of Related Art

An air intake system includes an air cleaner that is disposed above an engine main body mounted on a vehicle body frame and is connected to cylinder heads of the engine main body and an air introducing unit for introducing air into an air inlet provided at a lateral part of the air cleaner on at least one side thereof in a vehicle width direction. The air introducing unit has an opened front end and is connected to the air cleaner so as to bend an intake direction from a vehicle front-rear direction to the vehicle width direction.

Such an intake system is already known due to Patent Document Japanese Patent Laid-Open No. 2005-343356.

However, if the configuration is employed in which air whose intake direction has been converted from the vehicle front-rear direction to the vehicle width direction is introduced into the air inlet of the air cleaner as disclosed in Japanese Patent Laid-Open No. 2005-343356, the air is introduced into the air cleaner with disturbance of an airflow generated at a conversion part of the intake direction, which possibly precludes achievement of the desired intake efficiency for the engine.

SUMMARY OF THE INVENTION

The present invention is made in view of such circumstances and an object thereof is to provide an intake system of a saddle-type vehicle that prevents air from being introduced into an air cleaner with disturbance of the airflow, and thereby contributes to enhanced intake efficiency of an engine.

In accordance with the present invention, an intake system of a saddle-type vehicle includes an air cleaner that is disposed above an engine main body mounted on a vehicle body frame and is connected to cylinder heads of the engine main body, and an air introducing unit for introducing air into an air inlet provided at a lateral part of the air cleaner on at least one side thereof in vehicle width direction. The air introducing unit has an open front end and is connected to the air cleaner so as to bend the intake direction from a vehicle front-rear direction to the vehicle width direction. A plurality of ribs that partition the air inlet into a plurality of sections are provided in the air inlet.

Therefore, although the air introducing unit for introducing air into the air inlet bends the intake direction from the vehicle front-rear direction to the vehicle width direction and disturbance of the airflow is generated at the bending part, air is introduced into the air cleaner after its airflow is regulated by the plural ribs. This makes it possible to extend part of the air introducing unit in the vehicle front-rear direction to ensure a capacity of the air introducing unit, and can contribute to enhancement in the intake efficiency of the engine through the airflow regulation for air to be introduced into the air cleaner.

In accordance with another aspect of the invention, the air introducing unit includes at least an intake duct that extends in the vehicle front-rear direction to introduce air from a front side and has, at a rear end part, a bending part that bends the intake direction from the vehicle front-rear direction to the vehicle width direction, and a connecting tube that has the air inlet in which the ribs are provided at a downstream end part and serves as part of the air introducing unit on a downstream side relative to the bending part. The connecting tube is connected to the air cleaner and is made of an elastic material. Therefore, the rigidity of the air inlet can be enhanced by the ribs and the downstream end part of the connecting tube can be assembled to the air cleaner while the air inlet is bent. Thus, both of ensuring of the rigidity and favorable assembly-ability can be achieved.

In further accordance with the present invention, the intake duct is disposed on an outer lateral side of at least one of a pair of left and right frame members that serve as part of the vehicle body frame and are disposed on both sides of the air cleaner, and part of the connecting tube is housed in a through-hole made in the at least one of the frame members. Therefore, the connecting tube can be supported by the frame member and an opening area of the connecting tube can be ensured.

In further accordance with the present invention, the air inlets are provided at the lateral parts of the air cleaner on both sides of the air cleaner in the vehicle width direction and the air introducing units as a pair of left and right units are connected to the air cleaner. This can sufficiently ensure a capacity of the intake into the air cleaner and achieve further enhancement in the intake efficiency of the engine.

In further accordance with the present invention, plurality of ribs are disposed in a honeycomb manner. Further, the plurality of ribs are so disposed as to radially extend from substantially a center part of the air inlet as viewed in the vehicle width direction. Therefore, the rigidity of the air inlet and a lateral part of the air cleaner around it can be enhanced and an opening area of the air inlet can be set larger. Thus, higher intake capacity can be ensured and further enhancement in the intake efficiency of the engine can be achieved.

In further accordance with the present invention, the air cleaner is disposed above the engine main body formed as a V-type engine such that part of the air cleaner is housed in a valley formed between a front bank and a rear bank included in the engine main body, and at least part of front-bank-side and rear-bank-side throttle bodies connected to the cylinder heads of the front bank and the rear bank is housed in the air cleaner. A cleaner element is disposed between the front-bank-side and rear-bank-side throttle bodies. As such, air introduced from the air inlet at the lateral part of the air cleaner on at least one side thereof in the vehicle width direction can be effectively filtered by the cleaner element disposed along an intake flow direction at substantially the center of the air cleaner between the front and rear throttle bodies.

In accordance with another aspect of the invention, a longitudinal direction of the cleaner element having a rectangular shape is set parallel to an axis line of a crankshaft that is rotatably borne by the engine main body and extends along the vehicle width direction. The cleaner element formed into a rectangular shape to increase a filtering area can be set along the intake flow direction and air can be filtered more effectively.

DETAILED DESCRIPTION OF THE PREFERRED EMBODIMENTS

Embodiments of the present invention will be described below with reference to the accompanying drawings. In the following description, front and rear directions, upward and downward directions, and left and right directions refer to directions from a viewpoint of a rider riding a motorcycle.

Figure 1:
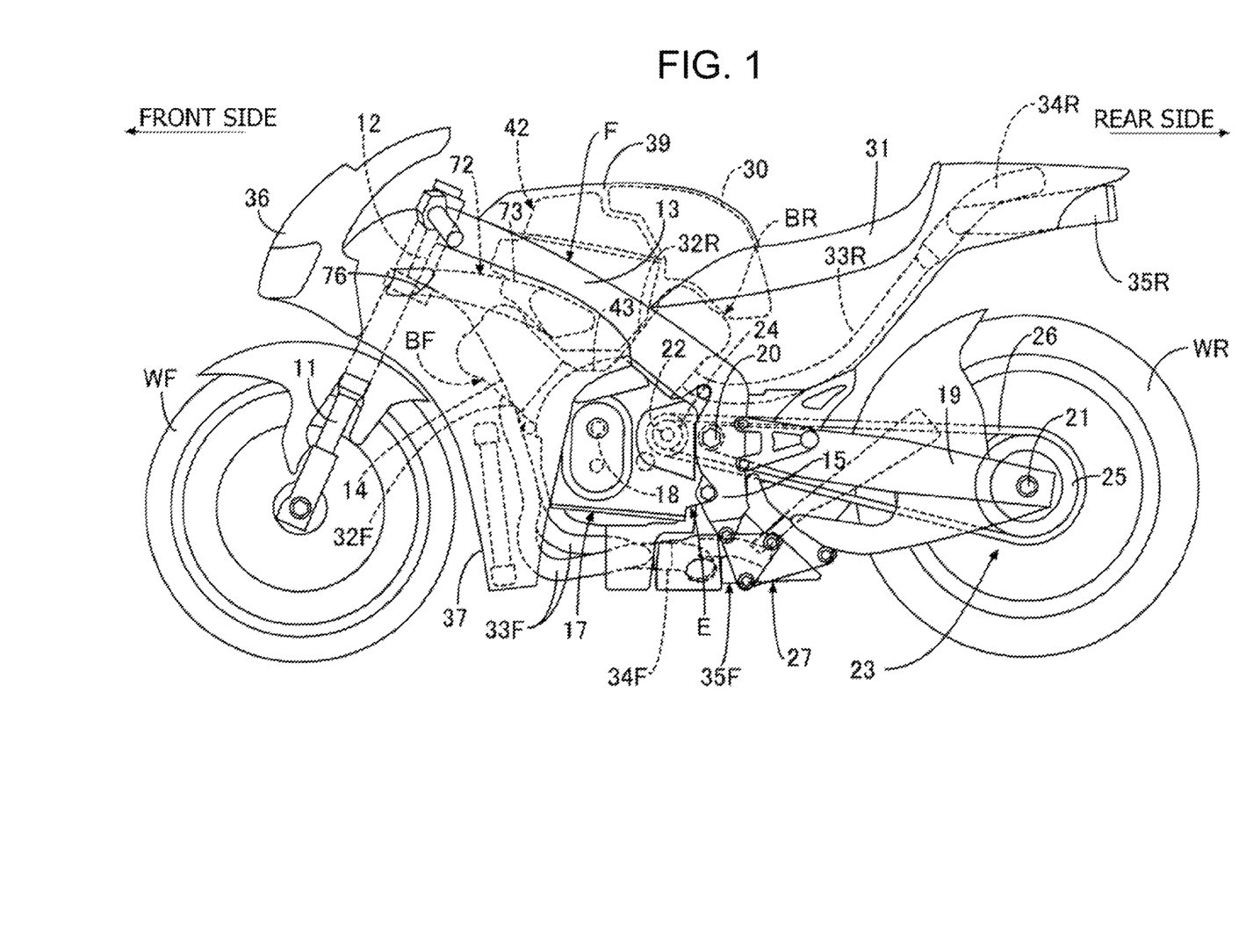
FIG. 1 is a left side view of a motorcycle according to a first embodiment of the present invention.

A first embodiment of the present invention will be described below with reference to FIGS. 1 to 7. Referring first to FIG. 1, a vehicle body frame F of a motorcycle that is a saddle-type vehicle includes the following components: a head pipe 12 that steerably bears a front fork 11 that pivotally supports a front wheel WF; a pair of left and right main frames 13 extending rearward and downward from this head pipe 12; a pair of left and right engine hangers 14 that are welded to the head pipe 12 and the front parts of both main frames 13 extend downward from the main frames 13; and a pair of left and right pivot frames 15 extending downward from rear parts of the main frames 13.

On the vehicle body frame F, an engine main body 17 of a V-type engine E formed with four cylinders is mounted, for example. In this embodiment, the engine main body 17 is supported by lower parts of the pair of engine hangers 14, intermediate parts of the main frames 13, and upper parts and lower parts of the pair of pivot frames 15 so as to rotationally bear a crankshaft 18 extending along the vehicle width direction. This engine main body 17 has a front bank BF and a rear bank BR disposed in a V-shape in such a manner that pairs of two cylinders are each lined in the axis line direction of the crankshaft 18.

At vertically intermediate parts of the pair of pivot frames 15, a front end part of a swing arm 19 is swingably mounted via a pivot 20. An axle 21 of a rear wheel WR is rotatably supported by a rear end part of this swing arm 19.

Power from an output shaft 22 of a transmission included in the engine main body 17 as a built-in component is transmitted to the rear wheel WR via a chain transmitting unit 23. This chain transmitting unit 23 is composed of a drive sprocket 24 fixed to the output shaft 22, a driven sprocket 25 fixed to the axle 21 of the rear wheel WR, and an endless chain 26 wound on these sprockets 24 and 25.

A front part of the swing arm 19 is connected to lower parts of the pair of pivot frames 15 with the intermediary of a link mechanism 27, and a rear cushion unit (not shown) is provided between a member forming part of this link mechanism 27 and the rear parts of the main frames 13.

A fuel tank 3 is supported by the main frames 13 above the rear bank BR in the engine main body 17 and a riding seat 31, disposed rearward of this fuel tank 30, is supported at a rear part of the vehicle body frame F.

A pair of front-bank-side individual exhaust pipes 33F communicating with a cylinder head 32F of the front bank BF in the engine main body 17 on each cylinder basis pass below the engine main body 17 and are extended rearward to be connected to a front-bank-side collecting exhaust pipe 34F in common. This front-bank-side collecting exhaust pipe 34F is connected to a front-bank-side exhaust muffler 35F disposed rearward and downward of the engine main body 17. A pair of rear-bank-side individual exhaust pipes 33R that communicate with a cylinder head 32R of the rear bank BR in the engine main body 17 on each cylinder basis and are extended rearward are connected to a rear-bank-side collecting exhaust pipe 34R on a rear side of the riding seat 31. This rear-bank-side collecting exhaust pipe 34R is connected to a rear-bank-side exhaust muffler 35R disposed above the rear wheel WR.

The head pipe 12 in the vehicle body frame F is covered by a front cowl 36 from its front side. A front part of the vehicle body frame F and part of the engine main body 17 are covered by a pair of left and right center cowls 37 from lateral sides. The rear part of the vehicle body frame F, the rear-bank-side individual exhaust pipes 33R, the rear-bank-side collecting exhaust pipe 34R, and the rear-bank-side exhaust muffler 35R are covered by a rear cowl 38 in such a manner that a rear part of the rear-bank-side exhaust muffler 35R is protruded rearward.

Above the engine main body 17 and on a front side of the fuel tank 30, a single air cleaner 42 common to the front bank BF and the rear bank BR is disposed so as to be partially housed in a valley 43 between the front bank BF and the rear bank BR and to be interposed between the pair of left and right main frames 13, which are a pair of left and right frame members serving as part of the vehicle body frame F. The air cleaner 42 is covered by a cover 39 together with the fuel tank 30.

Figure 2:
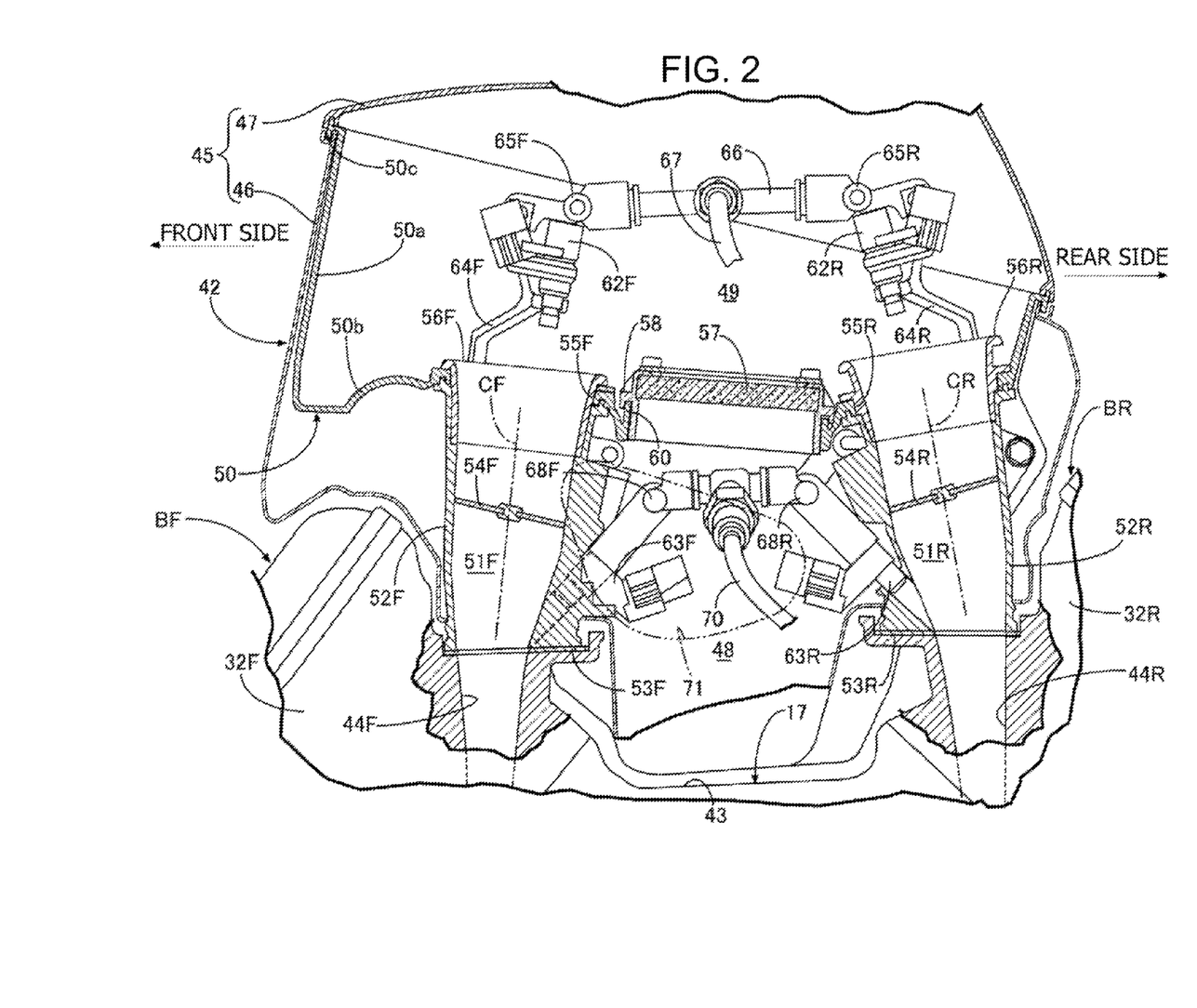
FIG. 2 is a longitudinal sectional view of a major part of an engine.

Referring to FIG. 2, on the sidewalls of the cylinder heads 32F and 32R in the front and rear banks BF and BR of the engine main body 17, intake ports 44F and 44R, which individually correspond to the pair of cylinders, extend in the upward-downward direction.

A cleaner case 45 of the air cleaner 42 is composed of a case main body 46 formed into a box shape opened upward and a case cover 47 joined to an upper end part of the case main body 46 to close the upper end opening of the case main body 46. A partition wall 50 that partitions an inside of this cleaner case 45 into an uncleaned air chamber 48 on a lower side and a cleaned air chamber 49 on an upper side is clamped between the case main body 46 and the case cover 47.

The partition wall 50 monolithically has a cylindrical sidewall part 50a closely opposed to an inner surface of the upper sidewall in the case main body 46 of the cleaner case 45 from the inside, a bottom plate part 50b provided continuously with a lower end of this sidewall part 50a, and a clamped part 50c that has a substantially T-shape as its longitudinal sectional shape and protrudes from an upper end of the sidewall part 50a toward an outer lateral side. The clamped part 50c is clamped between an upper end part of the case main body 46 and a lower end part of the case cover 47.

Front-bank-side throttle bodies 52F, each forming an intake path 51F that individually communicates with the intake port 44F for each cylinder in the cylinder head 32F of the front bank BF, penetrate a bottom wall 46a of the case main body 46 and are each connected to the cylinder head 32F with the intermediary of a gasket 53F. Rear-bank-side throttle bodies 52R, each forming an intake path 51R that individually communicates with the intake port 44R for each cylinder in the cylinder head 32R of the rear bank BR penetrate the bottom wall 46a of the case main body 46, and are each connected to the cylinder head 32R with the intermediary of a gasket 53R. That is, at least part of the front-bank-side and rear-bank-side throttle bodies 52F and 52R is housed in the uncleaned air chamber 48 of the air cleaner 42. In this embodiment, most of the front-bank-side and rear-bank-side throttle bodies 52F and 52R is housed therein.

In addition, center axis lines CF and CR of the intake paths 51F and 51R in the front-bank-side and rear-bank-side throttle bodies 52F and 52R in the state of being connected to the cylinder heads 32F and 32R are so inclined as to get closer to each other in the upward direction. In the front-bank-side and rear-bank-side throttle bodies 52F and 52R, throttle valves 54F and 54R to control the degree of opening of the intake paths 51F and 51R are pivotally supported.

Figure 3:
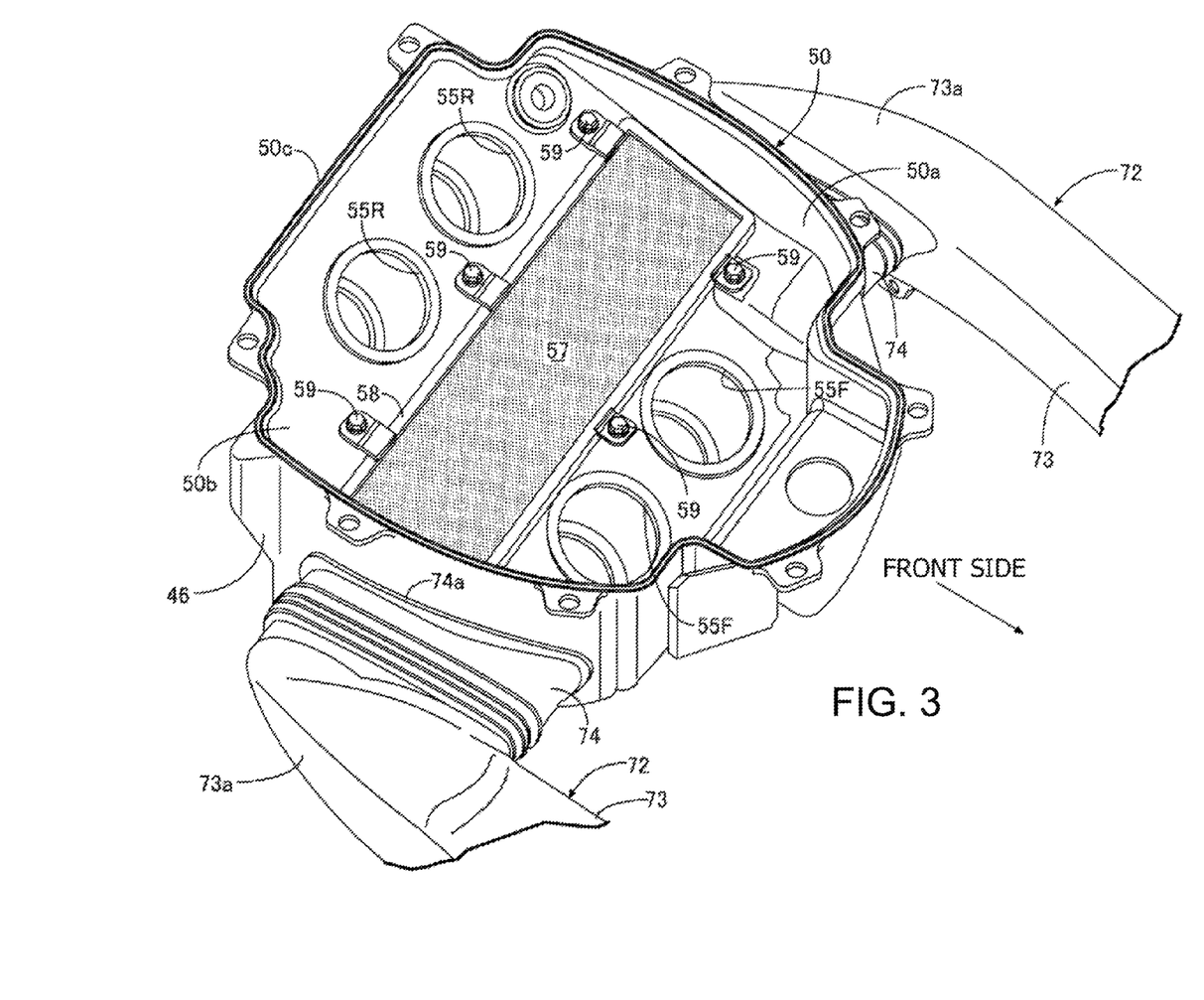
FIG. 3 is a perspective view of an air cleaner as viewed from an obliquely upper side of a right front side in a state in which a case cover is omitted.

Referring to FIG. 3 in combination, in the bottom wall part 50b of the partition wall 50, a pair of fitting holes 55F corresponding to the pair of front-bank-side throttle bodies 52F and a pair of fitting holes 55R corresponding to the pair of rear-bank-side throttle bodies 52R are made. Into these fitting holes 55F and 55R, air funnels 56F and 56R whose lower end parts are fitted and connected to upper end parts of the front-bank-side and rear-bank-side throttle bodies 52F and 52R are so fitted that their upper ends are opened to the cleaned air chamber 49.

In the air cleaner 42, a cleaner element 57 is disposed between the front-bank-side and rear-bank-side throttle bodies 52F and 52R. The cleaner element 57 is formed into a rectangular shape and is held by an element support frame 58. In the bottom wall part 50b of the partition wall 50, an opening 60 having a rectangular shape that is long in the vehicle width direction is made between the pair of fitting holes 55F corresponding to the front-bank-side throttle bodies 52F and the pair of fitting holes 55R corresponding to the rear-bank-side throttle bodies 52R. The element support frame 58, part of which is fitted into the opening 60, is fastened to the bottom wall part 50b of the partition wall 50 by plural bolts 59 such that the opening 60 is sealed up by the cleaner element 57.

That is, the cleaner element 57 has a rectangular shape and is disposed between the front-bank-side and rear-bank-side throttle bodies 52F and 52R in the air cleaner 42 with its longitudinal direction set parallel to the axis line of the crankshaft 18 extending along the vehicle width direction. Air introduced into the uncleaned air chamber 48 passes through the cleaner element 57 upward and is led to the cleaned air chamber 49. Then, the flow direction of the air cleaned by the cleaner element 57 is reversed to the direction from the cleaned air chamber 49 toward the lower side, so that the air passes through the air funnels 56F and 56R and the intake paths 51F and 51R to be introduced into the intake ports 44F and 44R.

In the cleaned air chamber 49, a pair of first fuel injection valves 62F and a pair of first fuel injection valves 62R that inject a fuel toward an inside of the intake paths 51F and 51R via the air funnels 56F and 56R, respectively, are disposed. On a downstream side relative to the first fuel injection valves 62F and 62R, a pair of second fuel injection valves 63F and a pair of second fuel injection valves 63R that inject the fuel toward the intake paths 51F and 51R, respectively, are attached to the front-bank-side and rear-bank-side throttle bodies 52F and 52R, respectively.

The first fuel injection valves 62F on the side of the front bank BF are supported by a valve support frame 64F attached to the bottom wall part 50b of the partition wall 50 so as to straddle the air funnels 56F from above. The first fuel injection valves 62R on the side of the rear bank BR are supported by a valve support frame 64R attached to the bottom wall part 50b of the partition wall 50 so as to straddle the air funnels 56R from above. A common fuel feed pipe 66 is connected to a fuel feed pipe 65F that is connected to the first fuel injection valves 62F on the side of the front bank BF and extends along the vehicle width direction in the cleaned air chamber 49 and a fuel feed pipe 65R that is connected to the first fuel injection valves 62R on the side of the rear bank BR and extends along the vehicle width direction in the cleaned air chamber 49. To this common fuel feed pipe 66, a fuel hose 67 inserted into the cleaned air chamber 49 of the air cleaner 42 to guide the fuel from the fuel tank 30 is connected.

On the other hand, a common fuel feed pipe 69 is connected to a fuel feed pipe 68F that is connected to the second fuel injection valves 63F on the side of the front bank BF and extends along the vehicle width direction in the uncleaned air chamber 48 and a fuel feed pipe 68R that is connected to the second fuel injection valves 63R on the side of the rear bank BR and extends along the vehicle width direction in the uncleaned air chamber 48. To this common fuel feed pipe 69, a fuel hose 70 inserted into the uncleaned air chamber 48 of the air cleaner 42 to guide the fuel from the fuel tank 30 is connected.

Figure 4:
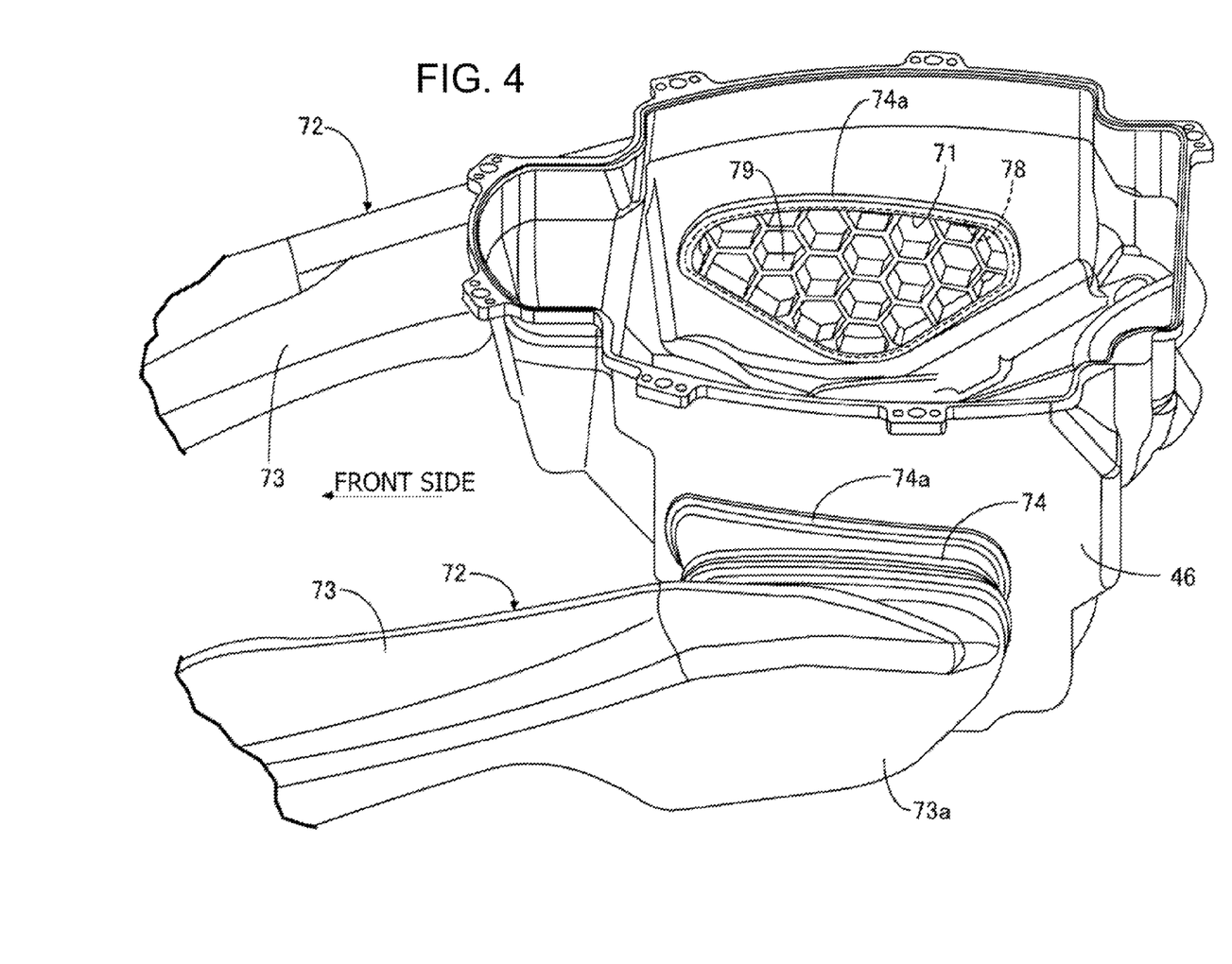
FIG. 4 is a perspective view of the air cleaner as viewed from an obliquely upper side of a left lateral side in a state in which the case cover and a partition wall are omitted.
Figure 5:
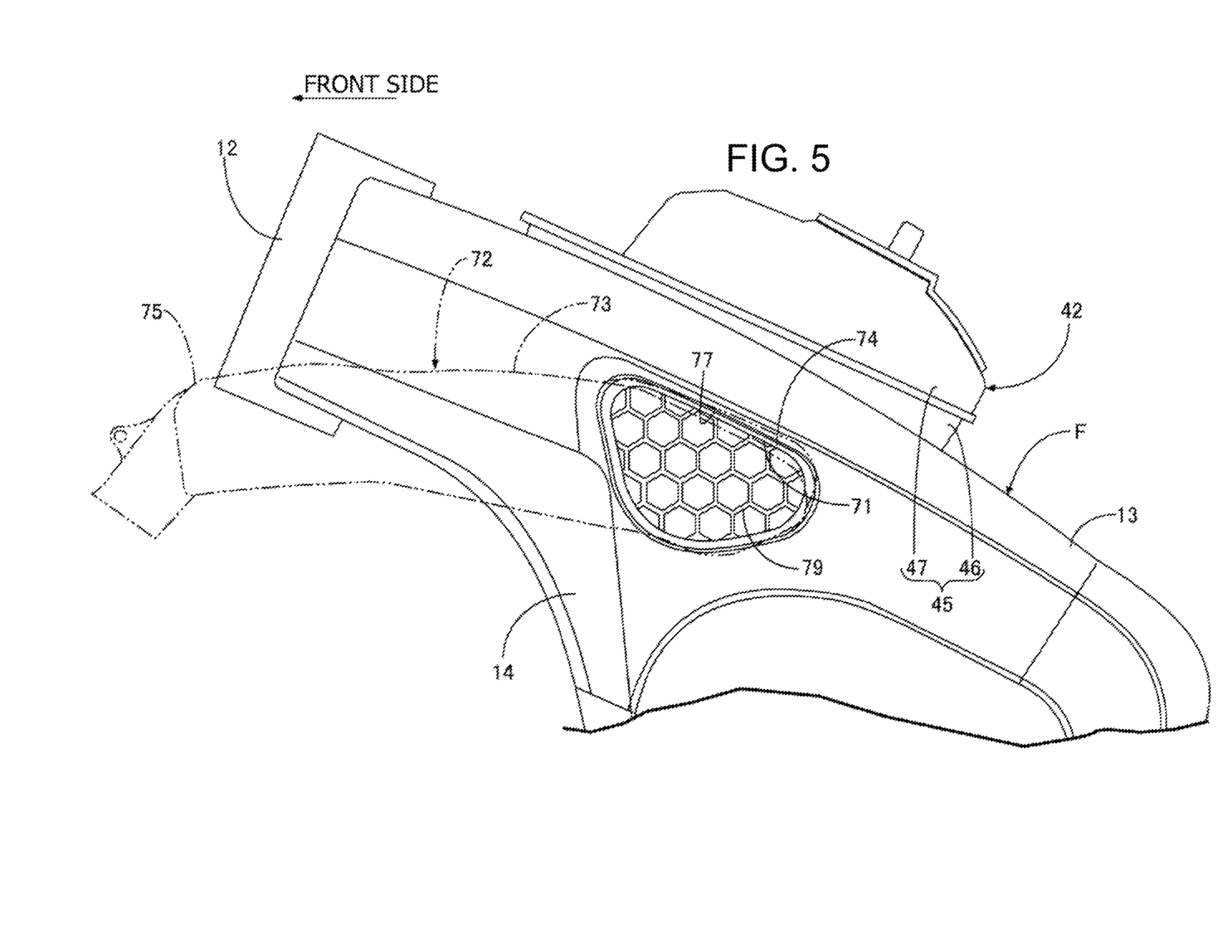
FIG. 5 is a side view of a front part of a vehicle body frame and the air cleaner.
Figure 6:
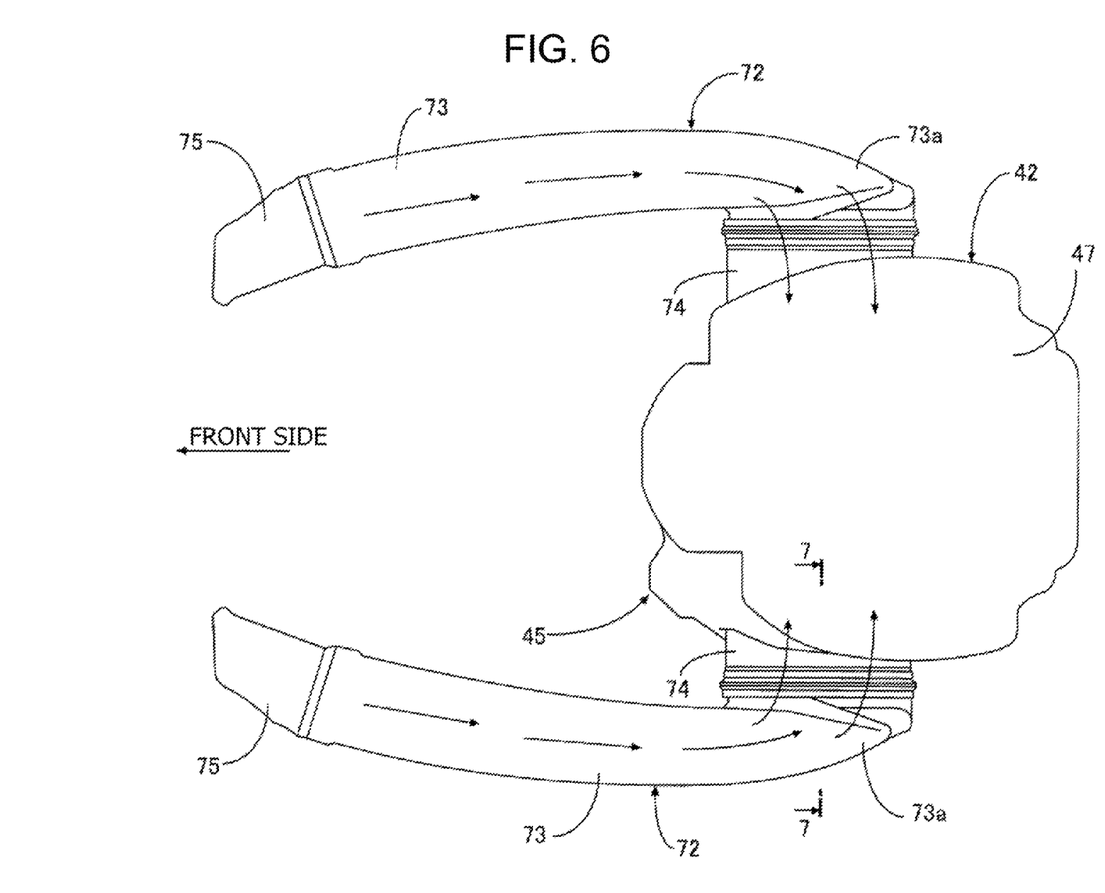
FIG. 6 is a plan view of the air cleaner and air introducing units.

Referring to FIGS. 4 to 6 in combination, an air inlet 71 is provided at a lateral part of the air cleaner 42 on at least one side thereof in the vehicle width direction. In this embodiment, the air inlets 71 are provided at the lateral parts on both sides in the vehicle width direction. A pair of left and right air introducing units 72 for introducing air into these air inlets 71 are connected to the air cleaner 42. These air introducing units 72 are so formed as to each have an opened front end and bend the intake direction from the vehicle front-rear direction to the vehicle width direction as shown by arrows in FIG. 6.

The air introducing unit 72 includes at least the following components: an intake duct 73 that extends in the vehicle front-rear direction having one end opened toward the vehicle front side and having, at a rear end part, a bending part 73a that bends the intake direction from the vehicle front-rear direction to the vehicle width direction; and a connecting tube 74 that has the air inlet 71 at a downstream end part and serves as part of the air introducing unit 72 on the downstream side relative to the bending part 73a. The connecting tube 74 is connected to the air cleaner 42 and is made of an elastic material. In this embodiment, the air introducing unit 72 is formed so as to include an entrance duct 75 communicating with a front end part of the intake duct 73 in addition to the intake duct 73 and the connecting tube 74. In addition, a front end part of the entrance duct 75 is connected to an inner surface of the center cowl 37 to communicate with an air intake 76 (see FIG. 1) made in a side surface of a front part of the center cowl 37.

Figure 7:
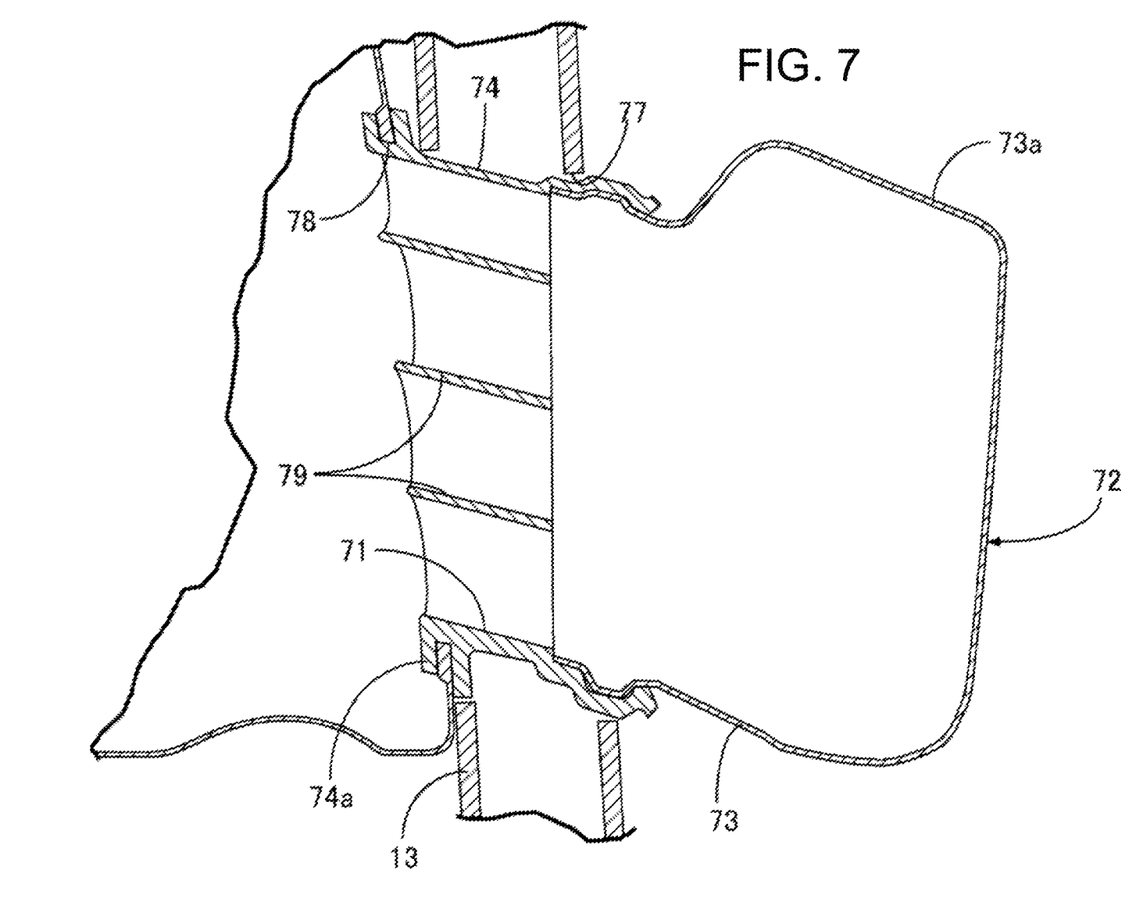
FIG. 7 is an enlarged sectional view along line 7-7 in FIG. 6.

Referring to FIG. 7 in combination, the intake duct 73 is disposed on an outer lateral side of at least one of the pair of left and right main frames 13. In this embodiment, the intake ducts 73 are disposed on the outer lateral side of both main frames 13. Part of the connecting tube 74 is housed in a through-hole 77 made in the main frame 13. That is, an upstream end part of the connecting tube 74 that extends along the vehicle width direction and penetrates the main frame 13 is connected to the bending part 73a at a rear end part of the intake duct 73.

Connection holes 78 are made at both lateral parts of the case main body 46 in the cleaner case 45 of the air cleaner 42. Downstream and parts of the connecting tubes 74 are fitted and connected to these connection holes 78. Specifically, the downstream end parts of the connecting tubes 74 are fitted and connected to the connection holes 78 such that a peripheral part of the connection hole 78 is fitted to an outer circumference of a connection flange part 74a that is monolithically provided at the downstream end part of the connecting tube 74 and flares toward an outer lateral side.

The downstream end part of the connecting tube 74 forms the air inlet 71 for introducing air into the uncleaned air chamber 48 of the air cleaner 42. In this air inlet 71, plural ribs 79 that partition the air inlet 71 into plural sections are provided. Specifically, the plural ribs 79 are monolithically provided at the downstream end part of the connecting tube 74 so as to be disposed in the air inlet 71. In this first embodiment, the ribs 79 are disposed in a honeycomb manner.

Next, the operation of this first embodiment will be described. The air introducing unit 72 for introducing air into the air inlet 71 provided at a lateral part of the air cleaner 42 on at least one side (both sides, in this embodiment) thereof in the vehicle width direction has an opened front end and is connected to the air cleaner 42 in such a manner as to bend the intake direction from the vehicle front-rear direction to the vehicle width direction. In this configuration, in the air inlet 71, the plural ribs 79 to partition this air inlet 71 into plural sections are provided. Therefore, although the air introducing unit 72 is to bend the intake direction from the vehicle front-rear direction to the vehicle width direction and disturbance of the airflow is generated at the bending part 73a, air is introduced into the air cleaner 42 after its airflow is regulated by the plural ribs 79. This makes it possible to extend part of the air introducing unit 72 in the vehicle front-rear direction to ensure the capacity of the air introducing unit 72, and can contribute to enhancement in the intake efficiency of the engine E through the airflow regulation for air to be introduced into the air cleaner 42.

Furthermore, the air introducing unit 72 includes at least the intake duct 73, which extends in the vehicle front-rear direction to guide air from the front side and has, at the rear end part, the bending part 73a to bend the intake direction from the vehicle front-rear direction to the vehicle width direction, and the connecting tube 74, which has the air inlet 71, in which the plural ribs 79 are provided, at the downstream end part and serves as part of the air introducing unit 72 on the downstream side relative to the bending part 73a. The connecting tube 74 is connected to the air cleaner 42 and is made of an elastic material. Therefore, the rigidity of the air inlet 71 can be enhanced by the plural ribs 79 and the downstream end part of the connecting tube 74 can be assembled to the air cleaner 42 while the air inlet 71 is bent. Thus, ensured rigidity and favorable assemblability can be achieved.

Moreover, the intake duct 73 is disposed on the outer lateral side of at least one (both, in this embodiment) of the pair of left and right main frames 13, which serve as part of the vehicle body frame F and are disposed on both sides of the air cleaner 42, and part of the connecting tube 74 is housed in the through-hole 77 made in the main frame 13. Therefore, the connecting tube 74 can be supported by the main frame 13 and the opening area of the connecting tube 74 can be ensured.

In addition, the air inlets 71 are provided at the lateral parts of the air cleaner 42 on both sides thereof in the vehicle width direction and the air introducing units 72 as a pair of left and right units are connected to the air cleaner 42. This can sufficiently ensure the capacity of the intake into the air cleaner 42 and achieve further enhancement in the intake efficiency of the engine E.

Furthermore, the plural ribs 79 are disposed in a honeycomb manner. Therefore, the rigidity of the air inlet 71 and a lateral part of the air cleaner 42 around it can be enhanced and the opening area of the air inlet 71 can be set larger. Thus, higher intake capacity can be ensured and further enhancement in the intake efficiency of the engine E can be achieved.

Furthermore, the air cleaner 42 is disposed above the engine main body 17 formed as a V-type engine in such a manner that part of the air cleaner 42 is housed in the valley 43 between the front bank BF and the rear bank BR included in the engine main body 17. At least part of the front-bank-side and rear-bank-side throttle bodies 52F and 52R connected to the cylinder heads 32F and 32R, respectively, of the front bank BF and the rear bank BR is housed in the air cleaner 42. In addition, the cleaner element 57 is disposed between the front-bank-side and rear-bank-side throttle bodies 52F and 52R. Thus, air introduced from the air inlets 71 at the lateral parts of the air cleaner 42 on both sides thereof in the vehicle width direction can be effectively filtered by the cleaner element 57 disposed along the intake flow directions at substantially the center of the air cleaner 42 between the front and rear throttle bodies 52F and 52R.

Moreover, the longitudinal direction of the cleaner element 57 having a rectangular shape is set parallel to the axis line of the crankshaft 18, which is rotatably borne by the engine main body 17 and extends along the vehicle width direction. Therefore, the cleaner element 57 formed into the rectangular shape to increase the filtering area can be set along the intake flow directions and air can be filtered more effectively.

Figure 8:
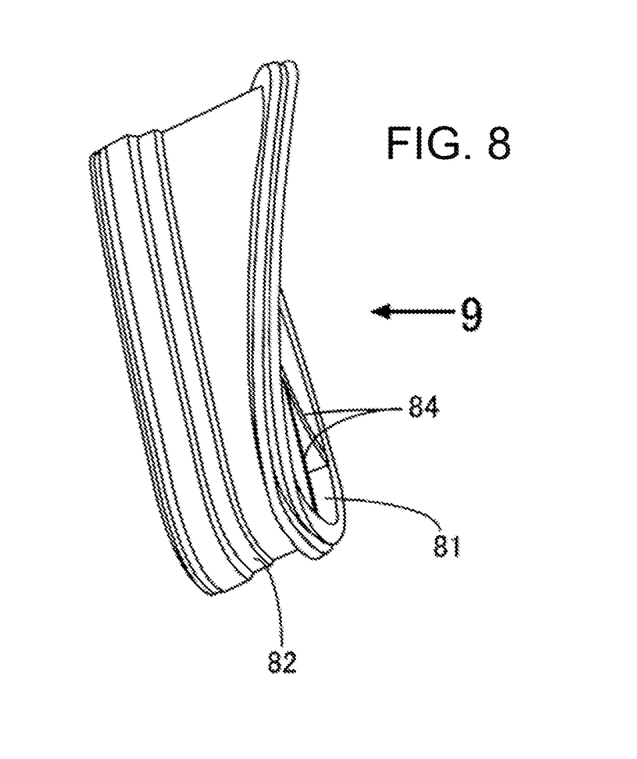
FIG. 8 is a side view of a connecting tube of a second embodiment.
Figure 9:
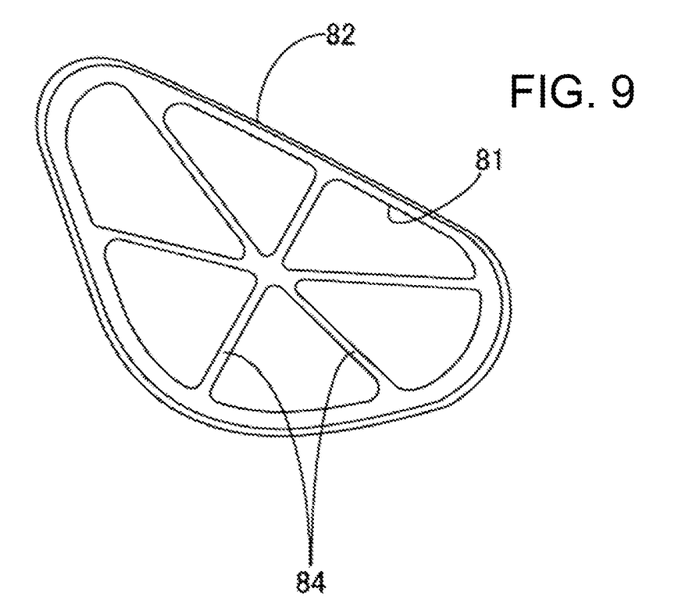
FIG. 9 is a diagram as viewed in a direction of arrow 9 in FIG. 8.

As a second embodiment of the present invention, a connecting tube 82 shown in FIGS. 8 and 9 may be used instead of the connecting tube 74 of the first embodiment. A downstream end part of this connecting tube 82 forms an air inlet 81 for introducing air into the air cleaner 42 (refer to the first embodiment). In this air inlet 81, plural ribs 84 that partition this air inlet 81 into plural sections are provided. Specifically, the plural ribs 84 are monolithically provided at the downstream end part of the connecting tube 82 so as to be disposed in the air inlet 81. In this second embodiment, the ribs 84 are so disposed as to radially extend from substantially a center part of the air inlet 81, as viewed in the vehicle width direction.

Also by this second embodiment, the same effects as those by the first embodiment can be achieved.

Although the embodiments of the present invention are described above, the present invention is not limited to the above-described embodiments and various design changes can be made without departing from the present invention set forth in the scope of claims.

DESCRIPTION OF REFERENCE SYMBOLS

13 . . . Main frame as frame member
17 . . . Engine main body
18 . . . Crankshaft
32F, 32R . . . Cylinder head
42 . . . Air cleaner
43 . . . Valley
52F . . . Front-bank-side throttle body
52R . . . Rear-bank-side throttle body
57 . . . Cleaner element
71, 81 . . . Air inlet 72 . . . Air introducing unit
73 . . . Intake duct
73a . . . Bending part
74, 82 . . . Connecting tube
77 . . . Through-hole
79, 84 . . . Rib
BF . . . Front bank
BR . . . Rear bank
F . . . Vehicle body frame

What is claimed is:

1. An intake system of a saddle-type vehicle comprising:
an air cleaner that is disposed above an engine main body mounted on a vehicle body frame and connected to cylinder heads of the engine main body; and
an air introducing unit for introducing air into an air inlet provided at a lateral part of the air cleaner on at least one side of the air cleaner in a vehicle width direction, the air introducing unit having an opened front end and being connected to the air cleaner so as to bend an intake direction from a vehicle front-rear direction to the vehicle width direction,
wherein a plurality of ribs that partition the air inlet into a plurality of sections are provided in the air inlet,
wherein the air introducing unit includes at least an intake duct that extends in the vehicle front-rear direction to guide air from a front side and has, at a rear end part, a bending part that bends the intake direction from the vehicle front-rear direction to the vehicle width direction, and a connecting tube that serves as part of the air introducing unit on a downstream side relative to the bending part, and the connecting tube is connected to the air cleaner,
wherein the intake duct is disposed on an outer lateral side of at least one of a pair of left and right frame members that serve as part of the vehicle body frame and are disposed on both sides of the air cleaner, and part of the connecting tube is housed in a through-hole formed in the at least one of the frame members.

2. The intake system of the saddle-type vehicle according to claim 1, wherein
the connecting tube includes the air inlet in which the plurality of ribs are provided at a downstream end part, and the connecting tube is made of an elastic material.

3. The intake system of the saddle-type vehicle according to claim 1, wherein the air inlets are provided at the lateral parts of the air cleaner on both sides of the air cleaner in the vehicle width direction and the air introducing units as a pair of left and right units are connected to the air cleaner.

4. The intake system of the saddle-type vehicle according to claim 3, wherein the plurality of ribs are disposed in a honeycomb manner.

5. The intake system of the saddle-type vehicle according to claim 3, wherein the plurality of ribs radially extend from substantially a center part of the air inlet as viewed in the vehicle width direction.

6. The intake system of the saddle-type vehicle according to claim 3, wherein:
the air cleaner is disposed above the engine main body formed as a V-type engine such that part of the air cleaner is housed in a valley formed between a front bank and a rear bank included in the engine main body, and at least part of front-bank-side and rear-bank-side throttle bodies connected to the cylinder heads of the front bank and the rear bank is housed in the air cleaner, and
a cleaner element is disposed between the front-bank-side and rear-bank-side throttle bodies.

7. The intake system of the saddle-type vehicle according to claim 1, wherein the plurality of ribs are disposed in a honeycomb manner.

8. The intake system of the saddle-type vehicle according to claim 1, wherein the plurality of ribs radially extend from substantially a center part of the air inlet as viewed in the vehicle width direction.

9. The intake system of the saddle-type vehicle according to claim 1, wherein:
the air cleaner is disposed above the engine main body formed as a V-type engine such that part of the air cleaner is housed in a valley formed between a front bank and a rear bank included in the engine main body, and at least part of front-bank-side and rear-bank-side throttle bodies connected to the cylinder heads of the front bank and the rear bank is housed in the air cleaner, and
a cleaner element is disposed between the front-bank-side and rear-bank-side throttle bodies.

10. The intake system of the saddle-type vehicle according to claim 9, wherein a longitudinal direction of the cleaner element having a rectangular shape is set parallel to an axis line of a crankshaft that is rotatably carried by the engine main body and extends along the vehicle width direction.

11. An intake system of a saddle-type vehicle comprising:
an air cleaner that is disposed above an engine main body mounted on a vehicle body frame and connected to cylinder heads of the engine main body; and
an air introducing unit for introducing air into an air inlet provided at a lateral part of the air cleaner on at least one side of the air cleaner in a vehicle width direction, the air introducing unit having an opened front end and being connected to the air cleaner so as to bend an intake direction from a vehicle front-rear direction to the vehicle width direction, wherein:
the air cleaner is disposed above the engine main body formed as a V-type engine such that part of the air cleaner is housed in a valley formed between a front bank and a rear bank included in the engine main body, and at least part of front-bank-side and rear-bank-side throttle bodies connected to the cylinder heads of the front bank and the rear bank is housed in the air cleaner, and
a cleaner element is disposed between the front-bank-side and rear-bank-side throttle bodies.

12. The intake system of the saddle-type vehicle according to claim 11, wherein
the air introducing unit includes at least an intake duct that extends in the vehicle front-rear direction to guide air from a front side and has, at a rear end part, a bending part that bends the intake direction from the vehicle front-rear direction to the vehicle width direction, and a connecting tube that serves as part of the air introducing unit on a downstream side relative to the bending part, and the connecting tube is connected to the air cleaner.

13. The intake system of the saddle-type vehicle according to claim 12, wherein the intake duct is disposed on an outer lateral side of at least one of a pair of left and right frame members that serve as part of the vehicle body frame and are disposed on both sides of the air cleaner, and part of the connecting tube is housed in a through-hole formed in the at least one of the frame members.

14. The intake system of the saddle-type vehicle according to claim 12, wherein a plurality of ribs that partition the air inlet into a plurality of sections are provided in the air inlet, and the connecting tube includes the air inlet in which the plurality of ribs are provided at a downstream end part.

15. The intake system of the saddle-type vehicle according to claim 11, wherein the air inlets are provided at the lateral parts of the air cleaner on both sides of the air cleaner in the vehicle width direction and the air introducing units as a pair of left and right units are connected to the air cleaner.

16. The intake system of the saddle-type vehicle according to claim 11, wherein a longitudinal direction of the cleaner element having a rectangular shape is set parallel to an axis line of a crankshaft that is rotatably carried by the engine main body and extends along the vehicle width direction.

* * * * *